(12) United States Patent
Tischer

(10) Patent No.: US 9,103,300 B2
(45) Date of Patent: Aug. 11, 2015

(54) EXHAUST GAS COOLER FOR AN EXHAUST GAS RECIRCULATION SYSTEM, AND AN EXHAUST GAS RECIRCULATION SYSTEM WITH SUCH AN EXHAUST GAS COOLER

(75) Inventor: Marcel Tischer, Dresden (DE)

(73) Assignee: Halla Visteon Climate Control Corporation, Daejeon-si (KR)

( * ) Notice: Subject to any disclaimer, the term of this patent is extended or adjusted under 35 U.S.C. 154(b) by 0 days.

(21) Appl. No.: 14/343,274

(22) PCT Filed: Sep. 10, 2012

(86) PCT No.: PCT/EP2012/067676
§ 371 (c)(1),
(2), (4) Date: Jun. 19, 2014

(87) PCT Pub. No.: WO2013/034774
PCT Pub. Date: Mar. 14, 2013

(65) Prior Publication Data
US 2015/0027419 A1    Jan. 29, 2015

(30) Foreign Application Priority Data

Sep. 8, 2011   (DE) .......................... 10 2011 082 381
Oct. 25, 2011  (DE) .......................... 10 2011 085 194

(51) Int. Cl.
*F02M 25/07*  (2006.01)
*F02D 41/00*  (2006.01)
(Continued)

(52) U.S. Cl.
CPC ....... *F02M 25/0728* (2013.01); *F02D 41/0055* (2013.01); *F02M 25/0729* (2013.01);
(Continued)

(58) Field of Classification Search
CPC .......... F02M 25/0737; F02M 25/0731; F02M 25/0728; F02M 25/0735
USPC ..................... 123/568.12, 568.2, 568.11, 698; 701/108; 60/288, 320, 321
See application file for complete search history.

(56) References Cited

U.S. PATENT DOCUMENTS

| | | | |
|---|---|---|---|
| 4,593,749 A | * | 6/1986 | Schatz .......................... 165/283 |
| 5,732,688 A | | 3/1998 | Charlton et al. |

(Continued)

FOREIGN PATENT DOCUMENTS

| | | |
|---|---|---|
| CN | 2789706 Y | 6/2006 |
| DE | 102006052972 A1 | 5/2008 |

(Continued)

OTHER PUBLICATIONS

International Search Report and Written Opinion of the International Searching Authority (English translation of the Written Opinion) dated Jan. 22, 2014 (11 pages).
(Continued)

*Primary Examiner* — Mahmoud Gimie
(74) *Attorney, Agent, or Firm* — Thomas B. Ryan; Harter Secrest & Emery LLP (57) ABSTRACT

The invention relates to an exhaust gas cooler for an exhaust gas recirculation system, in particular of a motor vehicle, said exhaust gas recirculation system having a total cooling power ($P_G$) and a total pressure loss coefficient ($D_G$). The exhaust gas cooler comprises: at least one cooling portion (20, 20') which has at least one cooling duct (22, 22') and at least one additional duct (24, 24'); at least one bypass which bypasses at least one of the cooling portions (20, 20'); and an exhaust gas routing device (40) which has at least one closing member (42); wherein the cooling duct (22, 22') has a first cooling power ($P_1$) and a first pressure loss coefficient ($D_1$), and the additional duct (24, 24') has a second cooling power ($P_2$) and a second pressure loss coefficient ($D_2$). The first cooling power ($P_1$) is greater than the second cooling power ($P_2$), and/or the first pressure loss coefficient ($D_1$) is greater than the second pressure loss coefficient ($D_2$). The closing member (42) is suitable for at least nearly preventing exhaust gases from flowing through the additional duct (24, 24') in order to increase the total cooling power ($P_G$) and/or the total pressure loss coefficient ($D_G$).

16 Claims, 6 Drawing Sheets

(51) Int. Cl.
  *F02M 25/00* (2006.01)
  *F28D 21/00* (2006.01)

(52) U.S. Cl.
  CPC ....... *F02M25/0731* (2013.01); *F02M 25/0732* (2013.01); *F02M 25/0734* (2013.01); *F02M 25/0735* (2013.01); *F28D 21/0003* (2013.01); *Y02T 10/121* (2013.01)

(56) References Cited

U.S. PATENT DOCUMENTS 8,403,031 B2 * 3/2013 Kuhnel et al. .................. 165/96
2009/0183861 A1 * 7/2009 Kuhnel et al. ................ 165/165

FOREIGN PATENT DOCUMENTS

| EP | 1277945 | A1 | | 1/2003 |
| GB | 2473821 | A | | 3/2011 |
| JP | 2002030994 | A | | 1/2002 |
| JP | 2009036063 | A | * | 2/2009 |
| WO | 2009/044947 | A1 | | 4/2009 |

OTHER PUBLICATIONS

Office Action received in corresponding Chinese Application No. 201280054951.6 (5 pages) dated Jan. 7, 2015.

* cited by examiner

EXHAUST GAS COOLER FOR AN EXHAUST GAS RECIRCULATION SYSTEM, AND AN EXHAUST GAS RECIRCULATION SYSTEM WITH SUCH AN EXHAUST GAS COOLER

FIELD OF INVENTION

The invention relates to an exhaust gas cooler for an exhaust gas recirculation system and an exhaust gas recirculation system comprising such an exhaust gas cooler.

BACKGROUND OF THE INVENTION

It is known in the field of engine technology to avoid emission of pollutants by partially rerouting exhaust gas to the fresh air side of the engine. Thus, it is necessary to cool the exhaust gas depending on the operational state of the engine. Particularly, it is undesirable at the same time to cool the exhaust gas at low engine temperatures and/or low engine load. For that purpose a bypass is provided bypassing the cooler, wherein a suitable valve setting controls how much exhaust gas flows through the bypass and the cooler, respectively.

A cooler of this sort is known from EP 1 277 945 A1. The cooler comprises a housing having ports to supply and discharge a coolant. Furthermore, a bypass pipe is provided bypassing the cooler in such way that the recirculated exhaust gas at least partially flows through the bypass pipe and is not cooled.

It is an object of the invention to provide an exhaust gas cooler for an exhaust gas recirculation system having an additional duty point.

SUMMARY OF THE INVENTION

To achieve this object, the invention among certain of its embodiments proposes an exhaust gas cooler and an exhaust gas recirculation system.

In accordance with the present invention the exhaust gas cooler for an exhaust gas recirculation system, particularly of a motor vehicle, comprises a total cooling power and a total pressure loss coefficient. The exhaust gas cooler comprises at least one cooling portion having at least one cooling duct and at least one additional duct, at least one bypass bypassing one of the at least one cooling portion, and an exhaust gas routing device having at least one closing member. The at least one cooling duct comprises a first cooling power and a first pressure loss coefficient, and the at least one additional duct comprises a second cooling power and a second pressure loss coefficient. The first cooling power is greater than the second cooling power and/or the first pressure loss coefficient is greater than the second pressure loss coefficient. The closing member is suitable to increase the total cooling power coefficient and/or the total pressure loss coefficient by nearly preventing flowing of the exhaust gas in the additional duct.

This embodiment has the advantage that an additional third duty point is provided which can be easily removed by replacing the exhaust gas routing device by a conventional exhaust gas routing device, for example a standard deflecting manifold, if there is no need for such third duty point, for example, in an additional sales market. The first two duty points are unaffected by this exchange. The utilization of a precooler can be foregone. Thereby, a light and compact design of the exhaust gas cooler is possible.

A higher cooling power causes a lower outlet temperature of the exhaust gas to be cooled with a steady inlet temperature. The pressure loss coefficient says something about which difference in pressure between inflow and outflow is needed for maintaining a certain flow through the component.

Preferably, the exhaust gas cooler has at least two ducts running in parallel and suitable to be independently flowed through by exhaust gas, wherein a first conduit is connected to the cooling duct and the second conduit is connected to the additional duct, and wherein the closing member is disposed within the second conduit. Preferably the first conduit and the second conduit are separated by a wall.

This embodiment presents the advantage that opening and closing of the closing member has no influence on the flow space of the second conduit, whereby the pressure loss coefficient of the cooling portion is unaffected by opening or closing the closing member. This embodiment has the additional advantage that the exhaust gas supplied to the exhaust gas routing device by the cooling duct can be supplied to an additional cooling portion independently of the exhaust gases supplied by the additional duct.

Preferably, the closing member is configured as a hatch or valve. Preferably, the closing member is arranged as a stroke valve.

In a preferred embodiment the exhaust gas cooler comprises two cooling portions connected via the exhaust gas routing device.

If the exhaust gas routing device comprises at least two parallel ducts which can be flowed through independently from each other by exhaust gas wherein the closing member is disposed within the second conduit and if the second conduit is supplied with exhaust gas via the additional duct by the cooling portion, the exhaust gases being passed on to an additional duct of a second cooling portion, the embodiment having two cooling portions is particularly advantageous. Therefore, the closing of the closing member causes the flow of exhaust gases to be interrupted at the same time within the additional duct of the first cooling portion upstream of the exhaust gas routing device and within the additional duct of the second cooling portion downstream of the exhaust gas routing device.

In a preferred embodiment of the exhaust gas cooler, the cooling portions are flush in order to form a connecting surface engaging the exhaust gas routing device.

This embodiment has the advantageous effect that the exhaust gas routing device can easily be interposed between two cooling portions. Also this embodiment allows the exhaust gas routing device to be replaced by a simpler deflecting manifold in order to deactivate the third duty point, as desired or needed. Appropriately, the exhaust gas cooler is formed as a U-cooler.

Alternatively, the cooler can also be formed as an I-cooler.

Preferably, the exhaust gas cooler is characterized in that the closing member closes the additional duct of at least one cooling portion.

This embodiment involves the technical effect of preventing the flow of exhaust gas through the additional duct independently whether the closing member is disposed on the downstream or upstream side of the cooling portion.

Preferably, the exhaust gas cooler is characterized by an inflow direction and an outflow direction, the inflow direction running approximately in parallel to and preferably extending in opposite direction to the outflow direction.

Preferably, the cooling duct is provided with a cooling member which is preferably formed in a wavelike manner and which further preferably extends over the whole length of the cooling channel. The cooling member can also be designated as a turbulator. Preferably, the cooling member can also be designated as "wellfin" or "winlet". Preferably, the cooling member is suitable for causing turbulence of the exhaust gas flowing through the cooling duct.

This embodiment provides an improved cooling power of the cooling ducts. Furthermore, with this embodiment an additional duct can be transformed into a cooling duct by inserting an additional cooling member. Conversely, a cooling duct can be transformed to an additional duct by removing the cooling member. This modular embodiment has the advantage that different duty points with different cooling powers can be provided without any additional construction effort and without changing the general design of the cooling portion, as desired. Merely the exhaust gas routing device, particularly the closing member, needs to be adapted accordingly.

Preferably, the cooling duct and the additional duct substantially have the same cross-section. With this embodiment cooling ducts can be transformed to additional ducts and vice versa.

In a preferred embodiment the cross-section is approximately constant over the whole length of the cooling duct and/or the additional duct. Since the pressure loss is caused by a cooling duct or an additional duct can be obtained depending on the cross-section of the component being flowed through, a constant cross-section facilitates the calculation of the length needed in order to achieve the pressure loss desired.

Preferably, the cross-section is approximately rectangular. Preferably, the cross-section has the shape of an elongated hole.

The exhaust gas recirculation system according to the invention comprises an exhaust gas cooler according to the invention.

BRIEF DESCRIPTION OF THE DRAWING FIGURES

Details and more advantages of the exhaust gas cooler according to the invention and the exhaust gas recirculation system according to the invention will be apparent from the description of the preferred exemplary embodiments below. The schematic drawings depicting exemplary embodiments illustrate in detail.

DETAILED DESCRIPTION OF THE INVENTION

The exhaust gas cooler 10 according to the invention comprises at least one cooling portion 20, 20', at least one bypass (not shown in the figures) and an exhaust gas routing device 40.

In both exemplary embodiments illustrated in the figures the exhaust gas cooler 10 is composed of two cooling portions 20, 20' connected via an exhaust gas routing device 40. The exhaust gas routing device 40 is interposed between the first cooling portion 20 and the second cooling portion 20'. The exhaust gases to be cooled enter the first cooling portion 20 in an inflow direction E and exit the second cooling portion 20' in an outflow direction A. The exhaust gas routing device 40 preferably reverses the flow direction of the exhaust gas. Hence, the exhaust gas cooler 10 can be formed as a so-called U-cooler which can be manufactured with minimum space requirements, in particular.

The exhaust gas routing device 40 includes a closing member 42 which can be operated by operating member 43.

The closing member 42 is suitable for shutting off the flow of exhaust gases through at least one additional duct 24, 24' of one of the cooling portions 20, 20'. In a preferred manner, the closing member 42 closes the additional duct 24, 24' of both cooling portions 20, 20', as is illustrated in particular in FIGS. 4 and 5 of the second exemplary embodiment.

Figure 3:
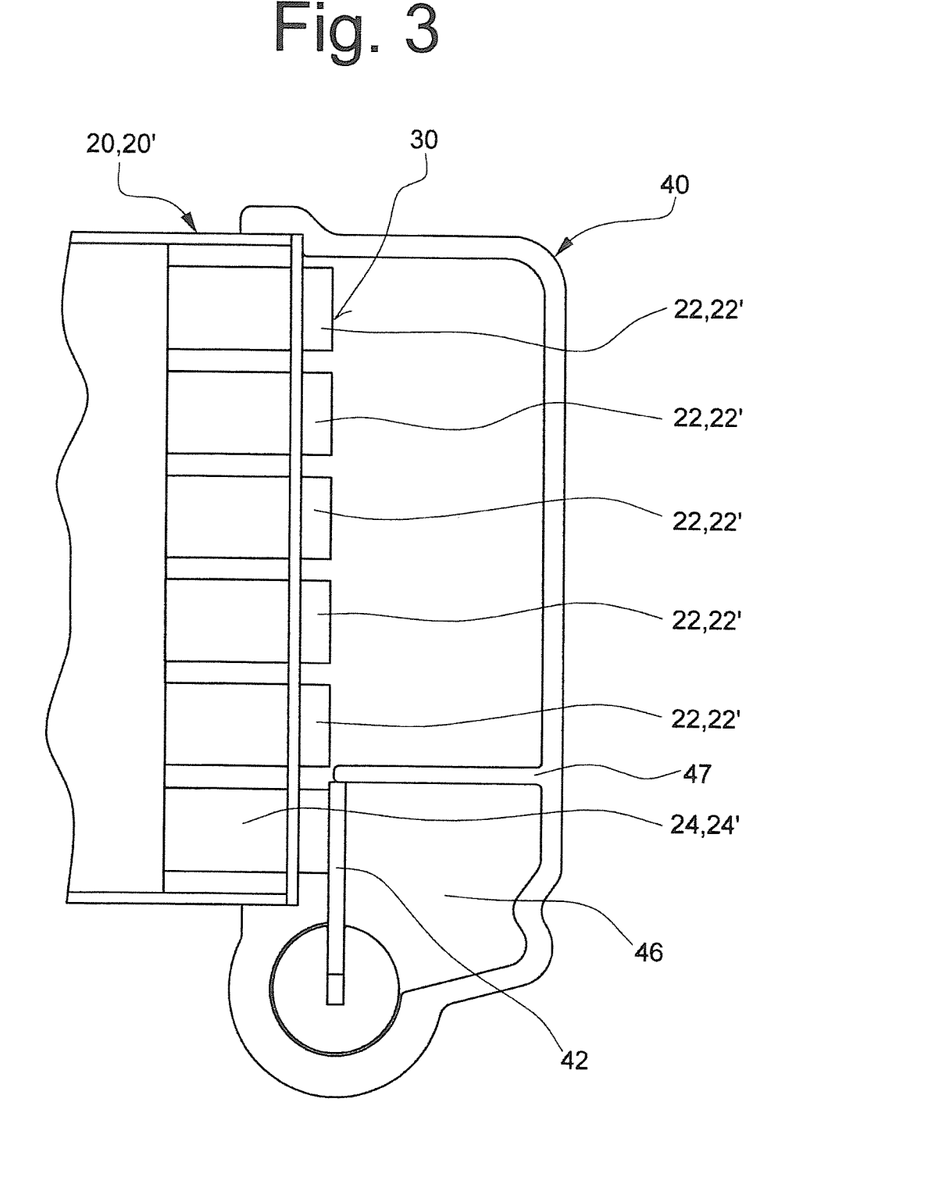
FIG. 3 a cross-section traversing the inflow direction and outflow direction of the exhaust gas cooler according to the invention corresponding to the first exemplary embodiment.

In a preferred embodiment the exhaust gas routing device 40 comprises a wall 47 dividing the exhaust gas routing device 40 into a first conduit 44 and a second conduit 46. With this embodiment of the exhaust gas cooler 10 the closing member 42 only closes the additional duct 24, 24' of at least one of both cooling portions 20, 20'. Due to the separation of both conduits 44, 46 it is sufficient to close conduit 46 either on the input or the output thereof. As particularly depicted in FIG. 3, the two conduits 44, 46 are formed by the wall 47.

Figure 4:
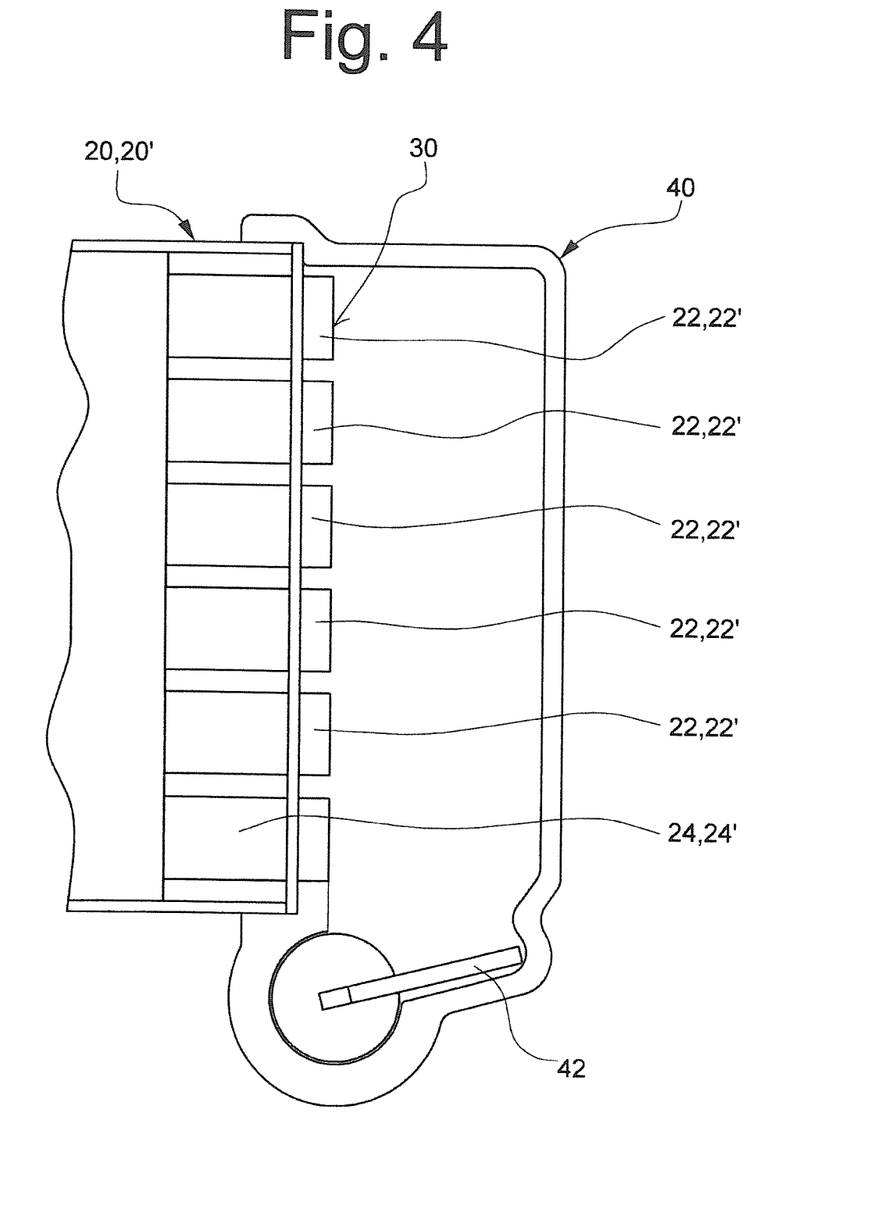
FIG. 4 a cross-section traversing the inflow direction and outflow direction of the exhaust gas cooler according to the invention corresponding to a second exemplary embodiment with the closing member being in the open position.
Figure 5:
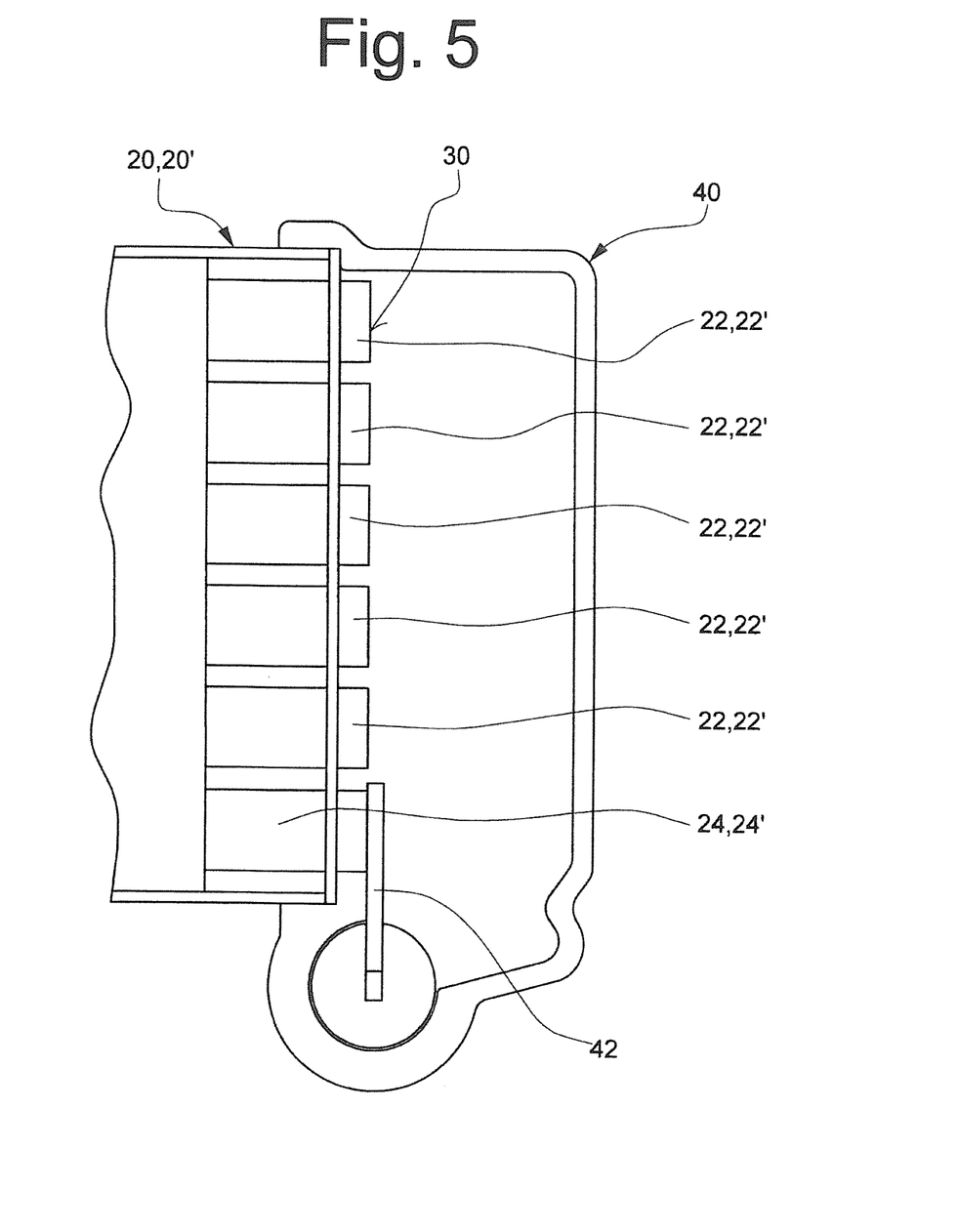
FIG. 5 a cross-section traversing the inflow direction and outflow direction of the exhaust gas cooler according to the invention corresponding to a second exemplary embodiment with the closing member being in the closed position.

With the embodiment illustrated in FIGS. 4 and 5 the wall 47 is not provided. Therefore, the closing member 42 of the exhaust gas routing device 40 interposed between two cooling portions 20, 20' closes the output of the additional duct 24 of the first cooling portion 20 and at the same time the input of the additional duct 24' of the second cooling portion 20'.

The exhaust gas routing device 40 is interposed between the first cooling portion 20 and the second cooling portion 20' in the direction of flow of the exhaust gas. The surface forming an outlet opening of the first cooling portion 20 and the surface forming an air inlet opening of the second cooling portion 20' together constitute a connecting surface 30 along which the exhaust gas routing device 40 is disposed. Thereby, with this embodiment the exhaust gas routing device 40 can be interposed between the first cooling portion 20 and the second cooling portion 20' by putting the exhaust gas routing device 40 on the connecting surface 30, in a simple manner.

Figure 1:
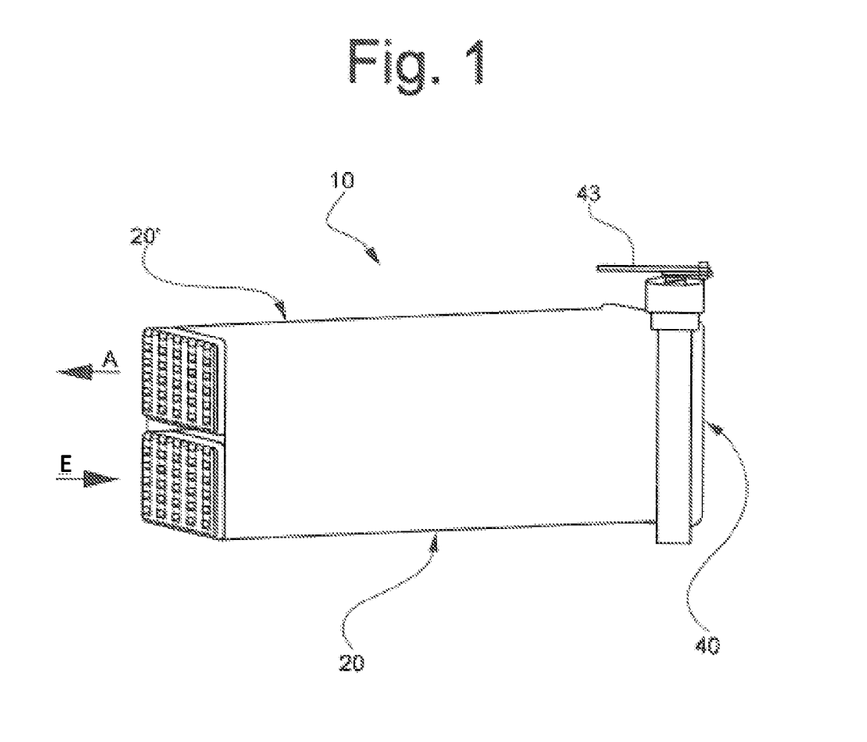
FIG. 1 a schematic view of the exhaust gas cooler according to the invention corresponding to a first exemplary embodiment.
Figure 1A:
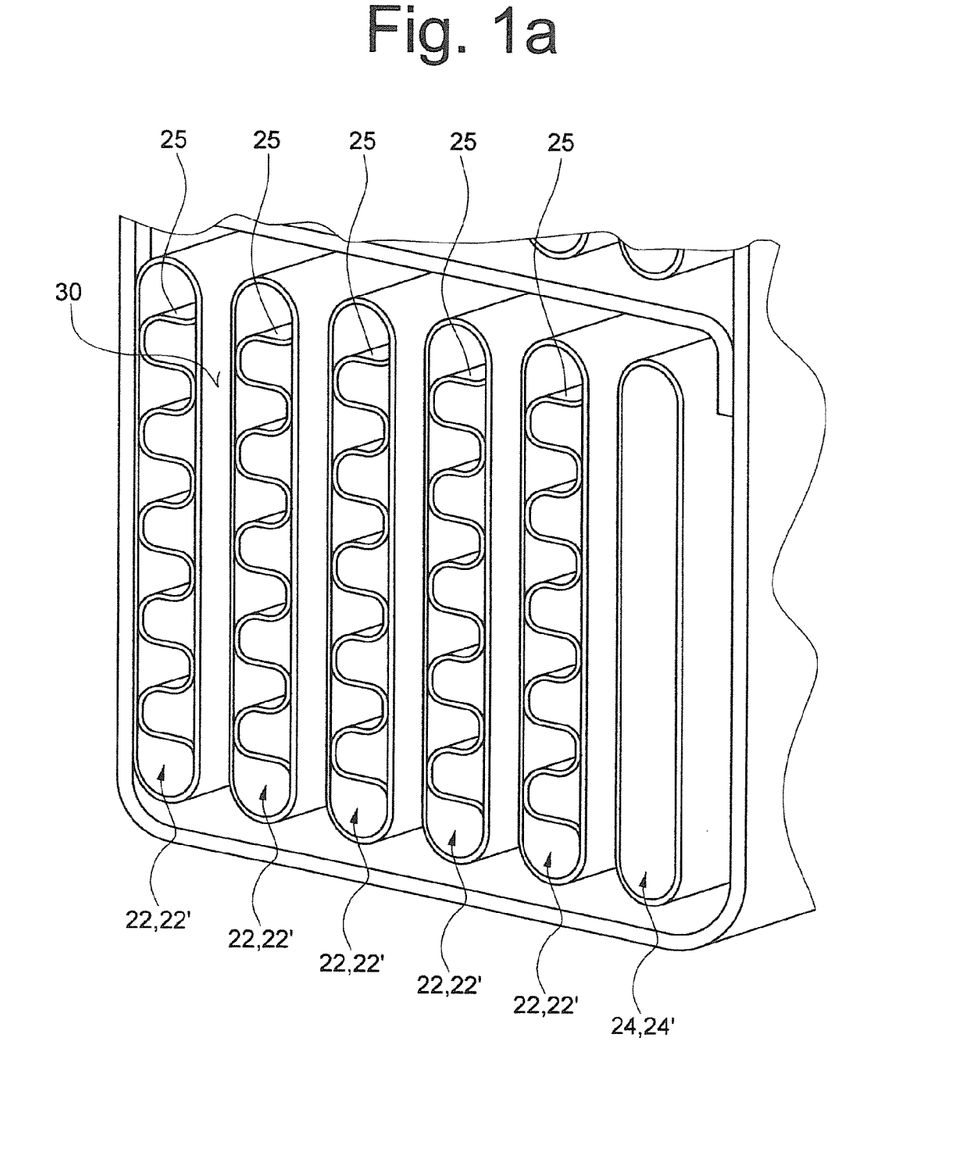
FIG. 1a a detailed view of the cooling portion of the exhaust gas cooler according to the invention corresponding to the first exemplary embodiment.
Figure 2:
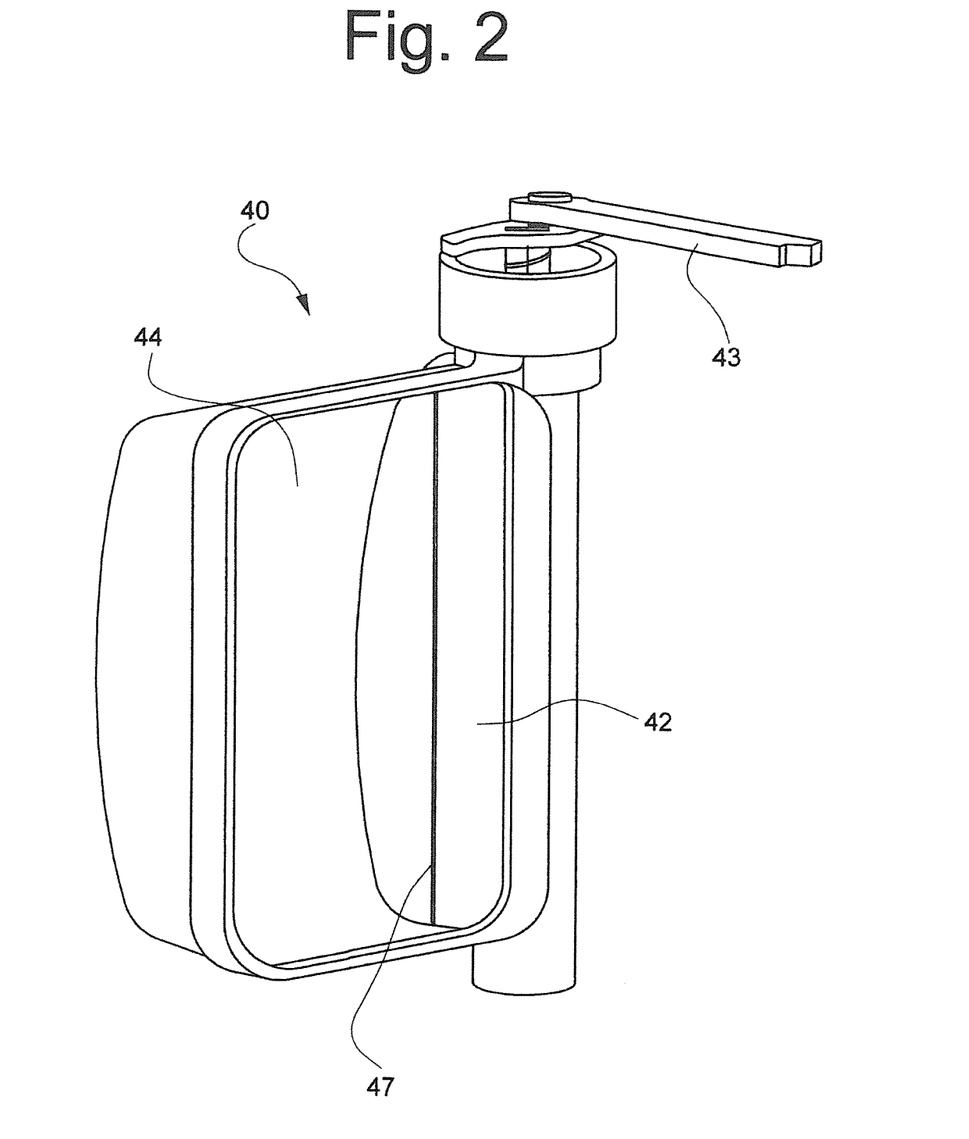
FIG. 2 a schematic view of the exhaust gas routing device of the exhaust gas cooler according to the invention corresponding to the first embodiment.

As particularly shown in FIG. 1a with the depicted exemplary embodiments, the cooling portion 20, 20' comprises five cooling ducts 22, 22' and an additional duct 24, 24', respectively. Within the five cooling ducts 22, 22' a cooling member 25 is provided, respectively, causing turbulence of the exhaust gas flowing through the cooling ducts 22, 22', thereby increasing the cooling power of the cooling ducts 22, 22'. In both embodiments illustrated in the figures the cooling ducts 22, 22' differ from the additional ducts 24, 24' solely by the presence or the absence of a cooling member 25. The cross-section of the cooling ducts 22, 22' and the additional ducts 24, 24' is otherwise the same. As particularly shown in FIG. 1a, the cooling ducts 22, 22' and the additional ducts 24, 24' substantially have a cross-section which is approximately rectangular, and preferably has the shape of an elongated hole.

This embodiment of the exhaust gas cooler 10 allows for the transformation of cooling ducts 22, 22' into additional ducts 24, 24' by removing the corresponding cooling member 25 from the cooling duct 22, 22', in a variable manner. Conversely, the additional duct 24, 24' can be transformed to a cooling duct 22, 22' by inserting a cooling member 25 into the additional duct 24, 24'. Thus, the exhaust gas cooler 10 can be set to different duty points by varying the number of ducts 22, 22', 24, 24' used as additional ducts 24, 24'.

In particular, the exhaust gas cooler 10 is preferably utilized when the exhaust gas cooler 10 is installed in a motor vehicle intended for different sales markets involving different requirements for the exhaust gas cooler 10. Then the cooling ducts 22, 22' and the additional ducts 24, 24' as well as the length of the cooling portions 20, 20' are selected in such a way that two duty points can be provided complying with the requirements of one of the sales markets, when the cooling portions 20, 20' are connected to a standard deflecting manifold (including the duty point provided by the bypass pipe) instead of the exhaust gas routing device 40. If now, with an additional sales market, an additional duty point is desired which allows a higher cooling power, the standard deflecting device is replaced by an exhaust gas routing device 40, whereby the third duty point is provided in a simple manner.

For an exemplary application the exhaust gas cooler 10 is supplied with 100 kg exhaust gas per hour at a temperature of 450° C. The temperature of the surface oriented outwards of the cooler is 95° C. If the exhaust gas cooler 10 is operated with the closing member 42 being opened (duty point 2), a pressure loss of 27.5 mbar is achieved with the outlet temperature of the exhaust gas being 201° C. Whereas with the closing member 42 (duty point 3) being closed, a pressure loss of 53 mbar is achieved, and the outlet temperature is only 174° C. Thus, the total cooling power $P_G$ is substantially lower with the closing member 42 being opened compared to the closing member 42 being closed.

REFERENCE SIGNS

10 exhaust gas cooler
20 cooling portion
20' cooling portion
22 cooling duct
22' cooling duct
24 additional duct
24' additional duct
25 cooling member
30 connecting surface
40 exhaust gas routing device
42 closing member
43 operating member
44 conduit
46 conduit
47 wall
E inflow direction
A outflow direction
$P_G$ total cooling power
$P_1$ cooling power
$P_2$ cooling power
$D_G$ total pressure loss coefficient
$D_1$ pressure loss coefficient
$D_2$ pressure loss coefficient

The invention claimed is:

1. Exhaust gas cooler for an exhaust gas recirculation system, particularly of a motor vehicle, having a total cooling power (Pc) and a total pressure loss coefficient (DG), comprising:
    at least one cooling portion having at least one cooling duct and at least one additional duct;
    at least one bypass bypassing one of the at least one cooling portion; and
    an exhaust gas routing device having at least one closing member;
    the at least one cooling duct having a first cooling power (P1) and a first pressure loss coefficient (D1), and the at least one additional duct having a second cooling power (P2) and a second pressure loss coefficient (D2),
    the first cooling power (P1) being greater than the second cooling power (P2) and the first pressure loss coefficient (Dl) being greater than the second pressure loss coefficient (D2),
    wherein the total cooling power (PG) coefficient and the total pressure loss coefficient (DG) increase, when the closing member nearly prevents flowing of the exhaust gas in the additional duct,
    wherein the at least one cooling portion includes two cooling portions connected via the exhaust gas routing device, and
    wherein the cooling duct is provided with a cooling member that is formed wavelike and extends over the whole length of the cooling duct, and no cooling member is provided in the additional duct.

2. Exhaust gas cooler of claim 1, wherein the exhaust gas routing device has at least two conduits running in parallel and suitable to be independently flowed through by exhaust gas, wherein a first of the at least two conduits is connected to the cooling duct and a second conduit of the at least two conduits is connected to the additional duct, and wherein the closing member is disposed within the second conduit.

3. Exhaust gas cooler of claim 1, wherein the two cooling portions are flush in order to form a connecting surface engaging the exhaust gas routing device.

4. Exhaust gas cooler of claim 1, wherein the closing member closes the additional duct of the at least one cooling portion.

5. Exhaust gas cooler of claim 1, wherein the exhaust gas enters a first of the two cooling portions in an inflow direction (E) and exits a second of the two cooling portions in an outflow direction (A), the inflow direction (E) running approximately in parallel to and extending in an opposite direction to the outflow direction (A).

6. Exhaust gas cooler of claim 1, wherein the cooling duct and the additional duct substantially have the same cross-section.

7. Exhaust gas cooler of claim 6, wherein the cross-section is approximately constant over the whole length of the cooling duct and the additional duct.

8. Exhaust gas cooler according of claim 6, wherein the cross-section is substantially rectangular.

9. Exhaust gas recirculation system comprising the exhaust gas cooler of claim 1.

10. Exhaust gas cooler of claim 2, wherein the two cooling portions are flush in order to form a connecting surface engaging the exhaust gas routing device.

11. Exhaust gas of claim 2, wherein the closing member closes the additional duct of the at least one cooling portion.

12. Exhaust gas cooler of claim 2, wherein the exhaust gas enters a first of the two cooling portions in an inflow direction (E) and exits a second of the two cooling portions in an outflow direction (A), the inflow direction (E) running approximately in parallel to and extending in an opposite direction to the outflow direction (A).

13. Exhaust gas cooler of claim 10, wherein the exhaust gas enters a first of the two cooling portions in an inflow direction (E) and exits a second of the two cooling portions in an outflow direction (A), the inflow direction (E) running approximately in parallel to and extending in an opposite direction to the outflow direction (A).

14. Exhaust gas cooler of claim 2, wherein the cooling duct and the additional duct substantially have the same cross-section.

15. Exhaust gas cooler of claim 3, wherein the cooling duct and the additional duct substantially have the same cross-section.

16. Exhaust gas cooler of claim 14, wherein the cross-section is approximately constant over the whole length of the cooling duct and the additional duct.

* * * * *